(12) United States Patent
Obara

(10) Patent No.: US 6,420,809 B1
(45) Date of Patent: Jul. 16, 2002

(54) BEARING STRUCTURE FOR FLAT MOTOR

(75) Inventor: Rikuro Obara, Nagano-ken (JP)

(73) Assignee: Minebea Co. Ltd., Nagano (JP)

( * ) Notice: Subject to any disclaimer, the term of this patent is extended or adjusted under 35 U.S.C. 154(b) by 0 days.

(21) Appl. No.: 09/599,541

(22) Filed: Jun. 23, 2000

(30) Foreign Application Priority Data

Jul. 15, 1999 (JP) .......................... 11-201540

(51) Int. Cl.⁷ .......................... H02K 5/16; F16C 21/00
(52) U.S. Cl. .......................... 310/90; 384/127
(58) Field of Search .......................... 310/90, 90.5, 66, 310/67 R; 384/127, 126, 470, 494, 495, 523, 524, 624, 101, 102, 279, 902

(56) References Cited

U.S. PATENT DOCUMENTS

| | | | |
|---|---|---|---|
| 3,301,611 A | * 1/1967 | Dunlap | 308/5 |
| 3,393,022 A | * 7/1968 | Alven et al. | 308/35 |
| 3,914,071 A | * 10/1975 | Friese | 417/353 |
| 4,116,502 A | * 9/1978 | Horler et al. | 308/9 |
| 4,394,091 A | * 7/1983 | Klomp | 384/126 |
| 5,445,456 A | * 8/1995 | Isoda et al. | 384/126 |
| 5,683,183 A | * 11/1997 | Tanaka et al. | 384/100 |
| 5,806,988 A | * 9/1998 | Dublin, Jr. et al. | 384/128 |
| 6,081,057 A | * 6/2000 | Tanaka et al. | 310/90 |
| 6,104,114 A | * 8/2000 | Takeda et al. | 310/90 |
| 6,176,620 B1 | * 1/2001 | Obara | 384/127 |
| 6,208,050 B1 | * 3/2001 | Fujii et al. | 310/90 |

FOREIGN PATENT DOCUMENTS

| | | | |
|---|---|---|---|
| EP | 0 802 611 A1 | 10/1997 | ........... H02K/11/04 |
| GB | 407 855 | 3/1934 | |

OTHER PUBLICATIONS

Patent Abstracts f Japan, vol. 1999, No. 04, Apr. 30, 1999 (JP 11 018356A).
Patent Abstracts of Japan vol. 1999, No. 05, May 13, 1999 (JP 11 032460 A).

* cited by examiner

*Primary Examiner*—Nicholas Ponomarenko
*Assistant Examiner*—Dang Dinh Le
(74) *Attorney, Agent, or Firm*—Staas & Halsey LLP

(57) ABSTRACT

A bearing structure for a flat motor, having a rotor provided with a permanent magnet which is rotatively supported by the bearing structure mounted on a casing and by a stator structure mounted on the casing, in which the rotating magnetic field generated by the stator structure in opposition to the permanent magnet causes the rotor to rotate, and wherein either the outer race or the inner race of a compound bearing structure having a single row ball bearing and a cylindrical bearing, is fixed to the bearing structure mounted on the casing, while the other face is fixed to the rotor.

17 Claims, 11 Drawing Sheets

BEARING STRUCTURE FOR FLAT MOTOR

BACKGROUND OF THE INVENTION

1. Field of the Invention

The present invention relates to a bearing structure for a flat motor for use as the drive motor for magnetic disk drives or cooling fans mounted in office automation equipment.

2. Description of the Prior Art

Fans are mounted in the chassis walls of computers and peripheral equipment which contain a large number of heat emitting electronic circuits in order to expel the hot air from inside the chassis and keep the internal temperature low. Furthermore, electronic circuits such as CPUs which generate large amounts of heat may be fitted with their own cooling fans which blow air across cooling fins to dissipate the heat.

The prior art will not be described with reference to FIG. 20, which is a sectional diagram showing a conventional fan as described in U.S. Pat. No. 4,620,139. This fan 100 has a cylindrical bearing holder 51 in the center of the cup-shaped motor housing 50. Pluralities of supports 53 are positioned in space 52 on the inside of motor housing 50. Printed wiring circuit board 55 is arranged on top of stator yoke plate 54 which rests on the shoulder of bearing holder 51 and on the top of supports 53. A plurality of stator coils 56 are fixed to the top surface of printed wiring circuit board 55.

Two ball bearings 57, 58 are mounted at the upper and lower inside edges of bearing holder 51, and rotating shaft 59 is held in place by the inner races of these bearings. A cup-shaped boss 60 projects inwardly from the center of rotor 62, to the circumference of which are attached fan blades 61. The tip of said rotational shaft 59 is inserted into and fixed by said boss 60 allowing rotational shaft 59 and rotor 62 to rotate freely in relation to the motor housing 50. On the inside of rotor 2, rotor magnet 63 is arranged in opposition to stator coil 56 which is mounted on said printed wiring circuit board 55. The number 64 refers to the rotor yoke mounted on the reverse side of rotor magnet 63.

In the conventional flat fan motor described above, rotor 62 is made to rotate by the pulling action on rotor magnets 63 of the magnetic field generated in rotor coil 56 by the electronic components on printed wiring board 55. In order to allow stable rotation for said rotor 62 and to suppress vibration in the radial and axial directions, rotating shaft 59 is rotatively supported by two ball bearings 57, 58 arranged with a gap between them.

In response to the trend for various kinds of office automation equipment to be made smaller and thinner, there is a demand for smaller and thinner fans. Conventional motors such as that described above, in which 2 bearings are arranged with a gap between them in order to provide rotative support, have a structure which prevents the motor from being made smaller and thinner, and in addition they employ 2 high-priced ball bearings.

The present invention sets out to overcome the drawbacks of the conventional thin fan described above, with the objective of helping to make office automation equipment more compact and thinner. The new type of thin fan bearing structure provided by the present invention also allows the cost of such motors to be reduced.

SUMMARY OF THE INVENTION

In order to achieve the objectives described above, the present invention provides a bearing structure for a flat motor, having a rotor provided with permanent magnets which is rotatively supported by the bearing structure mounted on a casing and by a stator structure mounted on the casing, in which the rotating magnetic field generated by the stator structure in opposition to said permanent magnets causes the rotor to rotate; wherein either the outer race or the inner race of a compound bearing structure comprising one single row ball bearing and a cylindrical bearing, is fixed to the bearing structure mounted on said casing, while the other race is fixed to said rotor; the structure of said compound bearing comprising an outer race and an inner race, each fixed to opposing bearing portions and separated by a gap; a ball, which fits into ball grooves cut in the opposing surfaces of said inner and outer races which hold it so that it can roll freely; and a friction bearing, formed in a cylindrical shape and positioned on one side of the ball, and possibly also on the outer race and/or inner race; one face of said friction bearing being attached to either the inner or the outer face of one of the opposing bearing portions, the other face of said friction bearing forming a gap in opposition to the other opposing bearing portion, said gap restricting the inclination of the outer race and the inner race to within the specified permissible value.

Another present invention provides a bearing structure for a flat motor, having a rotor provided with permanent magnets which is rotatively supported by the bearing structure mounted on a casing and by a stator structure mounted on the casing, in which the rotating magnetic field generated by the stator structure in opposition to said permanent magnets causes the rotor to rotate; wherein either the outer race or the inner race of a compound bearing structure comprising one single row ball bearing and a cylindrical hearing, is fixed to the bearing structure mounted on said casing, while the other race is fixed to said rotor, the structure of said compound bearing comprising an outer race and an inner race, each fixed to opposing bearing portions and separated by a gap; a ball, which fits into ball grooves cut in the opposing surfaces of said inner and outer races which hold it so that it can roll freely; and a friction bearing, formed in a cylindrical shape and positioned on one side of the ball, and possibly also on the outer race and/or inner race; the outer face of said friction bearing being attached to a bearing portion and the inner face of said friction bearing being attached to the opposing bearing portion, the two faces forming a gap, said gap restricting the inclination of the outer race and the inner race to within the specified permissible value.

Still another present invention provides a bearing structure for a flat motor, having a rotor provided with permanent magnets which is rotatively supported by the bearing structure mounted on a casing and by a stator structure mounted on the casing, in which the rotating magnetic field generated by the stator structure in opposition to said permanent magnets causes the rotor to rotate; wherein either the outer race or the inner race of a compound bearing structure comprising one single row ball bearing and a cylindrical bearing, is fixed to the bearing structure mounted on said casing, while the other race is fixed to said rotor; the structure of said compound bearing comprising an outer race and an inner race, each fixed to opposing bearing portions and separated by a gap; a ball, which fits into ball grooves cut in the opposing surfaces of said inner and outer races which hold it so that it can roll freely; and a friction bearing, formed in a cylindrical shape and positioned on one side of the ball, and possibly also on the outer race and/or inner race; the inner face of said friction bearing being attached to a bearing portion and the outer face of said friction bearing being attached to the opposing bearing portion, the two faces forming a gap, said gap restricting the inclination of the outer race and the inner race to within the specified permissible value.

Further present invention provides a bearing structure for a flat motor, having a rotor provided with permanent magnets which is rotatively supported by the bearing structure mounted on a casing and by a stator structure mounted on the casing, in which the rotating magnetic field generated by the stator structure in opposition to said permanent magnets causes the rotor to rotate; wherein either the outer race or the inner race of a compound bearing structure comprising one single row ball bearing and a cylindrical bearing, is fixed to the bearing structure mounted on said casing, while the other race is fixed to said rotor; the structure of said compound bearing comprising an outer race and an inner race, each fixed to opposing bearing portions and separated by a gap; a ball, which fits into ball grooves cut in the center part of the opposing surfaces of said inner and outer races which hold it so that it can roll freely; and a friction bearing, formed in a cylindrical shape and positioned on both sides of the ball, and possibly also on the outer race and/or inner race; the outer face of said friction bearing being attached to a bearing portion and the inner face of said friction bearing being attached to one of the opposing bearing portions, the two faces forming a gap, said gap restricting the inclination of the outer race and the inner race to within the specified permissible value.

Further present invention provides a bearing structure for a flat motor, having a rotor provided with permanent magnets which is rotatively supported by the bearing structure mounted on a casing and by a stator structure mounted on the casing, in which the rotating magnetic field generated by the stator structure in opposition to said permanent magnets causes the rotor to rotate; wherein either the outer race or the inner race of a compound bearing structure comprising one single row ball bearing and a cylindrical bearing, is fixed to the bearing structure mounted on said casing, while the other race is fixed to said rotor; the structure of said compound bearing comprising an outer race and an inner race, each fixed to opposing bearing portions and separated by a gap; a ball, which fits into ball grooves cut in the center part of the opposing surfaces of said inner and outer races which hold it so that it can roll freely; and a friction bearing, formed in a cylindrical shape and positioned on both sides of the ball, and possibly also on the outer race and/or inner race; the inner face of said friction bearing being attached to a bearing portion and the outer face of said friction bearing being attached to one of the opposing bearing portions, the two faces forming a gap, said gap restricting the inclination of the outer race and the inner race to within the specified permissible value.

BRIEF DESCRIPTION OF THE DRAWING(S)

DESCRIPTION OF THE PREFERRED EMBODIMENTS

The first embodiment of the present invention will be described with reference to the explanatory diagrams.

Figure 1:
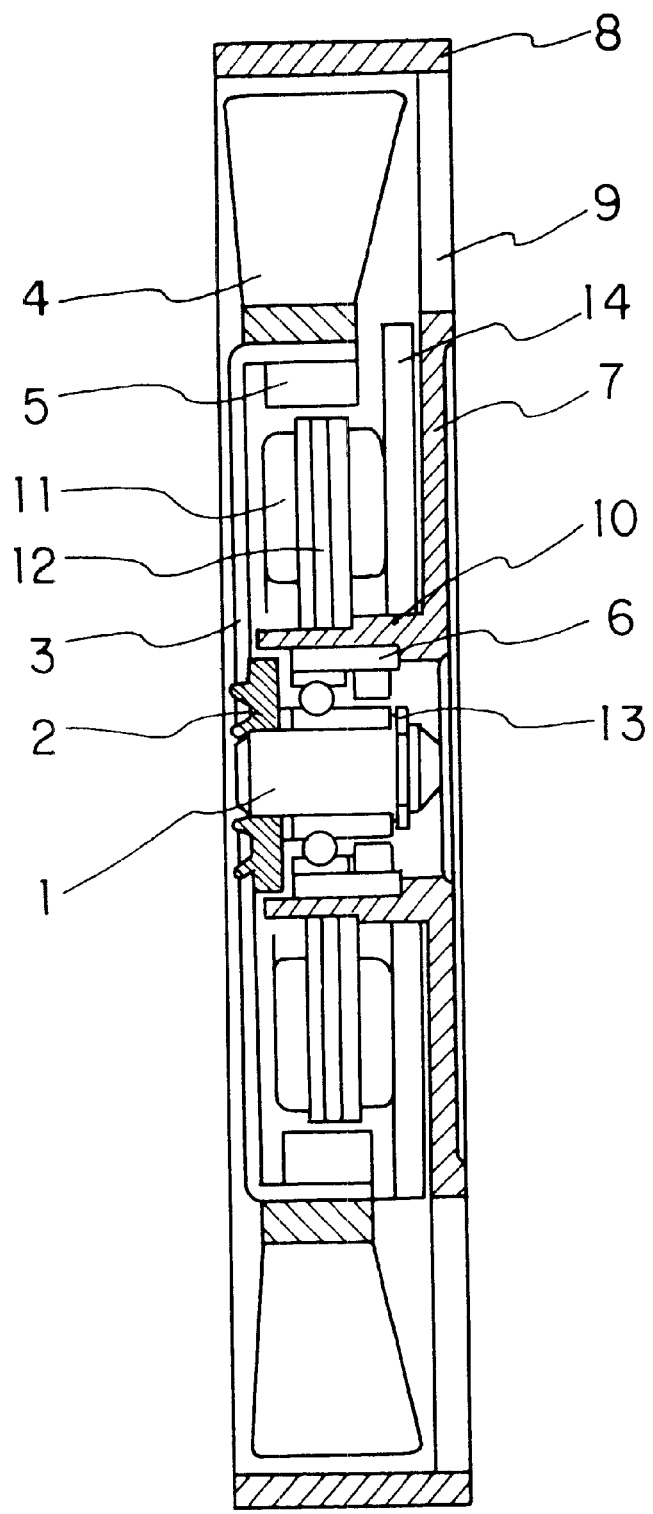
FIG. 1 is a sectional diagram showing an embodiment of the present invention.

FIG. 1 is a sectional diagram showing an embodiment of the present invention suitable for use in an axial flow fan. In the center part is provided a freely rotating shaft 1, with a bushing 2 being press fitted onto one end of said rotating shaft 1. Fan blades 4 are bonded to the outer circumference of cap-shaped yoke 3, which is formed from soft magnetic metal plate and fitted onto said bushing 2. A ring-shaped permanent magnet 5 is fixed to the inner circumference of said capshaped yoke 3. The inner circumferential surface of said permanent magnet 5 is magnetically formed so as to comprise alternately N and S poles. Rotating shaft 1, bushing 2, yoke 3, fan blades 4 and permanent magnet 5 comprise the rotor.

The motor base 7 which comprises the stator section is supported and fixed by four spokes 9 to casing 8 which forms the air duct of the axial flow fan. A vertically rising section 10 is provided in the central portion of said motor base 7. Arranged around the outer surface of vertically rising section 10 and facing permanent magnet 5 is stator core 12, around which is wrapped stator coil 11. One compound bearing 6 is packed in against the inner surface of vertically rising section 10 and rotatively supports the rotor. Casing 8, motor base 7 which supports it, vertically rising section 10, stator coil 11, and stator core 12 comprise the stator.

Figure 2:
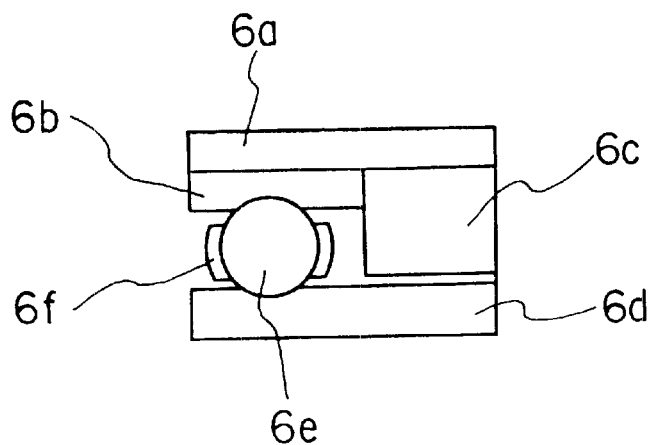
FIG. 2 is a sectional diagram showing a compound bearing used in an embodiment of the present invention.

Compound bearing 6, as shown in FIG. 2, comprises a ring 6b, which forms the outer race of the ball bearing, and a sintered bearing 6c, which are fixed to the inner face of housing 6a. Inner race 6d, which forms the inner race of the ball bearing or compound ball bearing, is supported in the same way as a regular ball bearing, by ball 6e and retainers 6f. To perform the same function as a regular ball bearing, sintered oil-impregnated bearing 6c determines the appropriate sized gap with the extension portion of inner race 6c in order to suppress the radial vibration of the rotating portion. The thrust load is generated by the positional relationship between permanent magnet 5 and rotor core 12, and this is supported by the ball bearing section. Retainer ring 13 is fitted to the tip of rotating shaft 1 in order to prevent the rotating portion from becoming detached.

Figure 3:
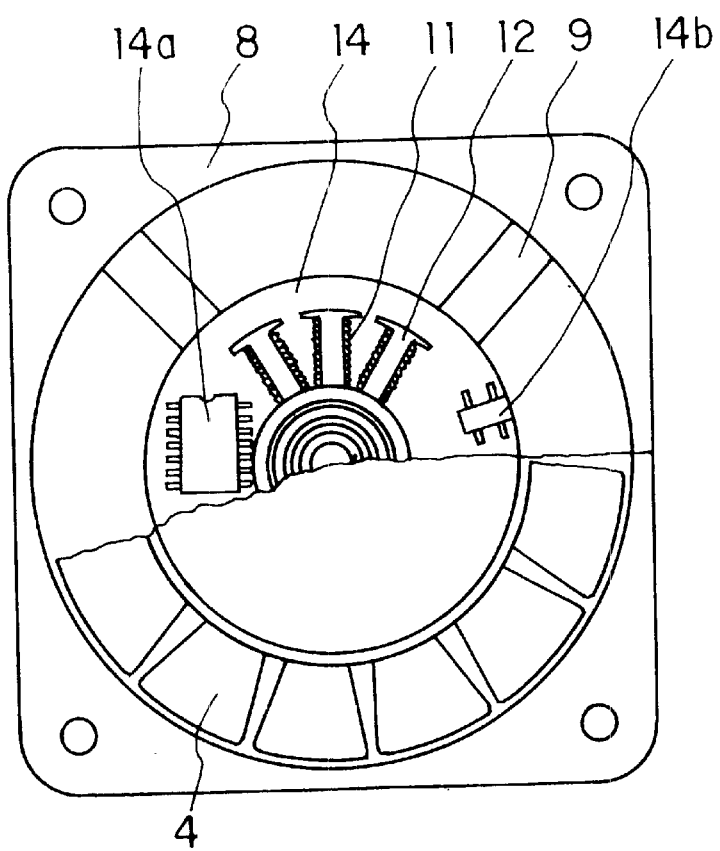
FIG. 3 is a plan diagram, partially cut away, showing an embodiment of the present invention.

Conventional axial flow fan motors employ a plurality of stator cores arranged around the rotating shaft at equal angles and pointing in the direction of emission. However, the axial flow fan motor provided by the present invention, as shown in FIG. 3, omits many of these stator cores. In the space saved on motor base 7 by the omission of these stator cores, electronic components such as switching circuit IC 14a and rotor position confirmation Hall element 14b can be mounted on printed wiring board 14.

Switching circuit IC 14a looks at the position of the rotating section as detected by Hall element 14b, and switches the voltage applied across stator coils 11 thus forming a rotating magnetic field at the tips of stator cores 12 and causing permanent magnet 5 to rotate.

The compound bearing used in the present invention can be employed in a number of configurations in addition to the embodiment described above. Various other embodiments of the compound bearing of the present invention will now be described in detail with the aid of diagrams. The compound bearing used in the present invention is employed in two basic configurations.

(1) A compound bearing equipped with a single row ball bearing and a single sintered oil-impregnated bearing mounted on one side of it (hereafter referred to as a single compound bearing).

Variations on this type of configuration will be described with reference to FIGS. 4 to 11.

(2) A compound bearing equipped with a single row ball bearing and two sintered oil-impregnated bearings mounted on each side of it (hereafter referred to as a double compound bearing).

Variations on this type of configuration will be described with reference to FIGS. 12 to 19.

The following is a general description of the characteristics of the above configurations.

1. Single compound bearing: Because it employs one sintered oil-impregnated bearing to prevent tilting, it has manufacturing and cost advantages over the double compound bearing but has slightly less tilting accuracy.
2. Double compound bearing: Because it employs two sintered oil-impregnated bearings to prevent tilting, it has some small manufacturing and cost disadvantages compared to the single compound bearing but has slightly greater tilting accuracy.

Next, a detailed description will be given for each compound bearing structure.

1. Single compound bearing

Figure 4:
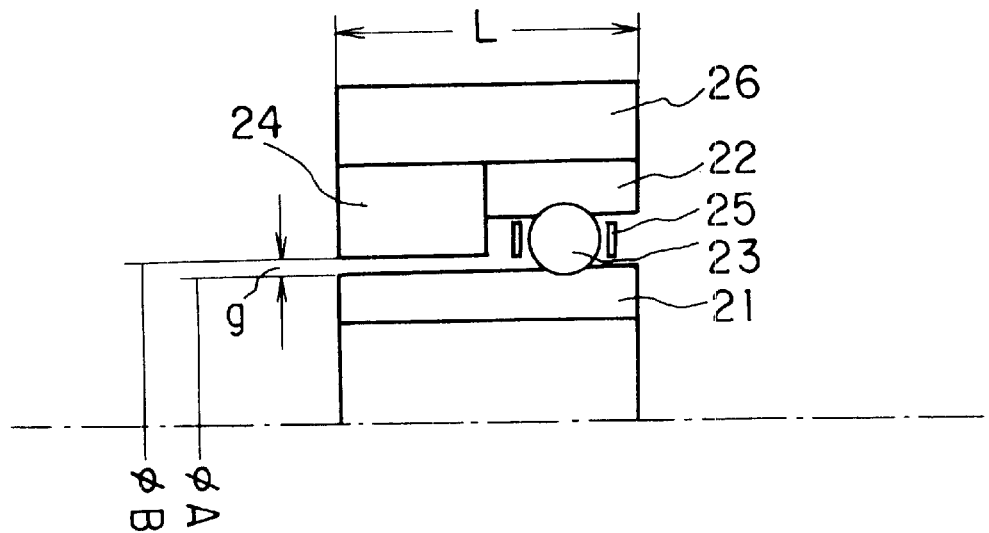
FIG. 4 is a sectional diagram showing the 1st embodiment of the present invention using a single compound bearing.

The single compound bearing, as shown in FIG. 4, in order to control the tilt of the axis to within the allowable range, is provided with an outer race 22, having a width which is half that of the width L of the inner race 21, from which is separated by a gap. Ball 23 is fitted into grooves provided in the outer side of inner race 21 and the inner side of outer race 22. Said ball 23 is retained within the ball grooves by retainer 25. The external form of inner race 21 is superfinished to high precision having a ball groove as described above. The outer sides of outer race 22 are fitted into outer race sleeve 26, which is a cylinder of metal construction having a width L which forms the outer race of the compound bearing.

Cylindrically shaped sintered oil-impregnated bearing 24 is fitted in the space formed to one side of outer race 22, ball 23 and retainer 25. The external dimension of said sintered oil-impregnated bearing 24 is the same as the inner diameter of outer race sleeve 26 and it has an inner diameter slightly larger than the outer diameter of inner race 21. Because of this, sintered oil-impregnated bearing 24 forms the small gap g with the outer circumferential face of inner race 21 as well as being fitted and fixed to the inner side of outer race sleeve 26. The size of gap g, in order to prevent tilt from exceeding the permissible range, depends on the dimensions A and B shown in FIG. 4, and therefore requires extremely precise machining.

During operation of the single compound bearing, if the side of outer race 22 or inner race 21 tilts, one edge of surface B of sintered oil-impregnated bearing 24 makes contact with surface A of inner race 21, thus preventing the shaft from inclining any further. The size of the permissible inclination can be determined by the size of tilt control gap g.

Figure 10:
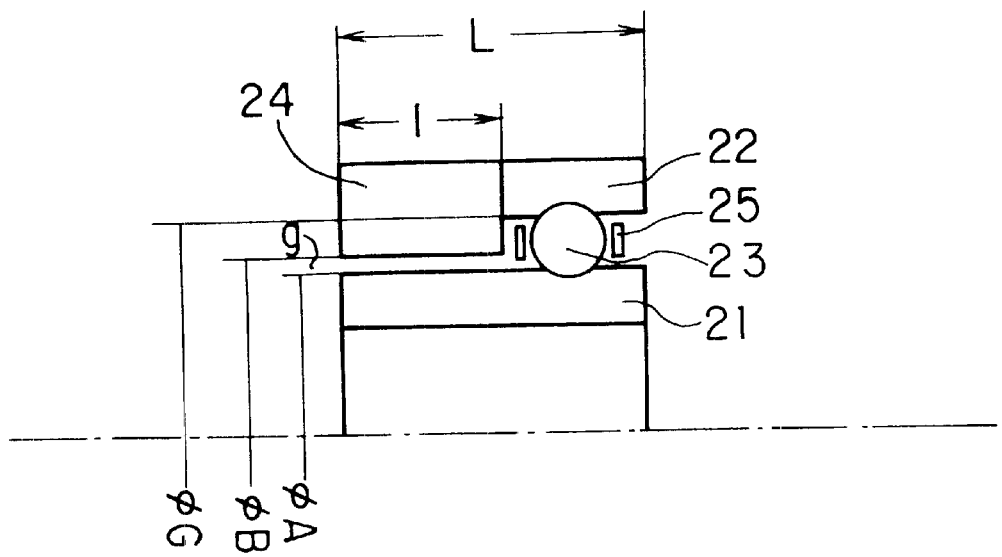
FIG. 10 is a sectional diagram showing the 7th embodiment of the present invention using a single compound bearing.

As described above, the single compound bearing essentially has a structure where a tilt control gap g is provided on the side of inner race 21. Similar structures are shown in FIGS. 6, 8 and 10, detailed descriptions of which follow.

Figure 6:
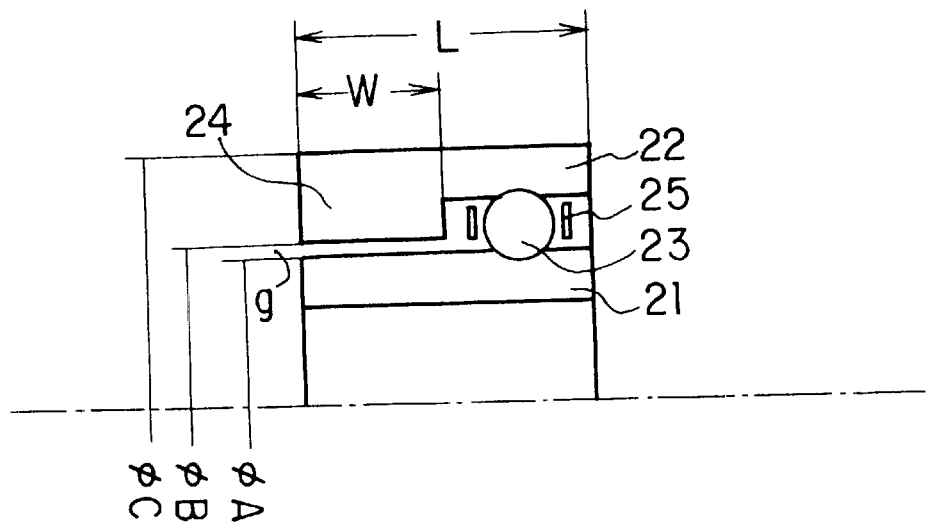
FIG. 6 is a sectional diagram showing the 3rd embodiment of the present invention using a single compound bearing.

The single compound bearing structure shown in FIG. 6 has a single compound bearing and a tilt control gap g provided on the side of inner race 21. Sintered oil-impregnated bearing 24, machined to dimensions of external diameter C, internal diameter B and width W, is assembled with the single ball bearing structure which comprises inner race 21, outer race 22, ball 23, and retainer 25. As shown in FIG. 6, this structure has no outer race sleeve, and instead, the outer face of sintered oil-impregnated bearing 24 is bonded or press fitted to the opposing part in order to maintain tilt control gap g.

This embodiment allows the omission of the outer race sleeve 26 shown in the embodiment illustrated by FIG. 4, and allows direct assembly with the opposing part. It thus provides the advantage of allowing the radial dimension to be made smaller.

Figure 8:
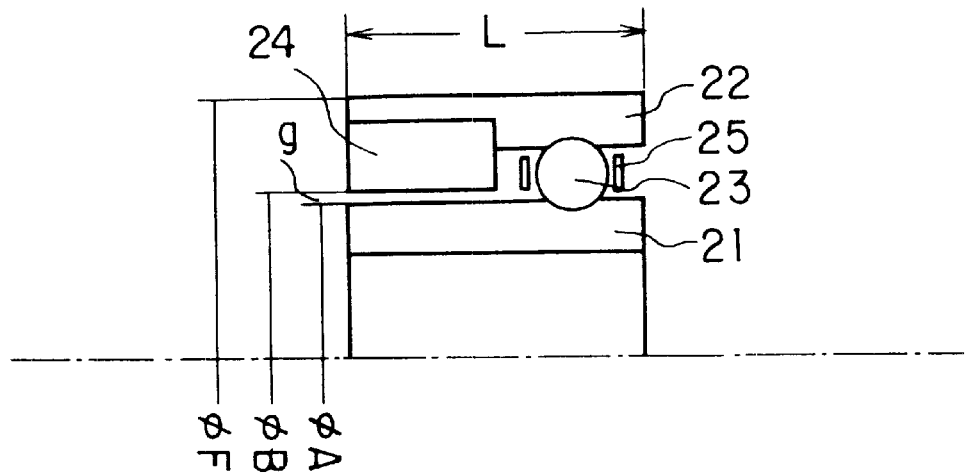
FIG. 8 is a sectional diagram showing the 5th embodiment of the present invention using a single compound bearing.

The single compound bearing structure shown in FIG. 8 has a single compound bearing and a tilt control gap g provided on the side of inner race 21. Sintered oil-impregnated bearing 24 is assembled with the single ball bearing structure which comprises inner race 21, outer race 22, ball 23, and retainer 25. Outer race 22 has a large diameter section F which is machined to have a step, and sintered oil-impregnated bearing 24 is press fitted or bonded securely to the outer face of this stepped outer race 22 in order to maintain tilt control gap g.

In the compound bearing structure of this embodiment, sintered oil-impregnated bearing 24 forms a solid single piece unit with outer race 22. The advantages of this structure are that it is easy to use and to handle, no outer race spacer is required, the radial dimension can be made smaller, and manufacturing costs can be reduced. Assembly accuracy is also high.

The single compound bearing structure shown in FIG. 10 has a single compound bearing and a tilt control gap g provided on the side of inner race 21. Sintered oil-impregnated bearing 24 is assembled with the single ball bearing structure which comprises inner race 21, outer race 22, ball 23, and retainer 25. Sintered oil-impregnated bearing 24 is press fitted or bonded securely to the inner diameter portion G of outer race 22 in order to maintain tilt control gap g with the dimensions A and B with regard to inner race 21.

In the compound bearing structure of this embodiment, the outer diameter of inner race 21 and the inner diameter of outer race 22 are both processed to standard bearing dimensions, and sintered oil-impregnated bearing 24 forms a solid single piece unit with outer race 22. The advantages of this structure are that it is easy to use and to handle, no outer race spacer is required, and it is not necessary to process the outer race to provide a step. As a result, this structure provides the smallest radial dimensions, manufacturing costs can be reduced, and assembly accuracy is high.

Figure 5:
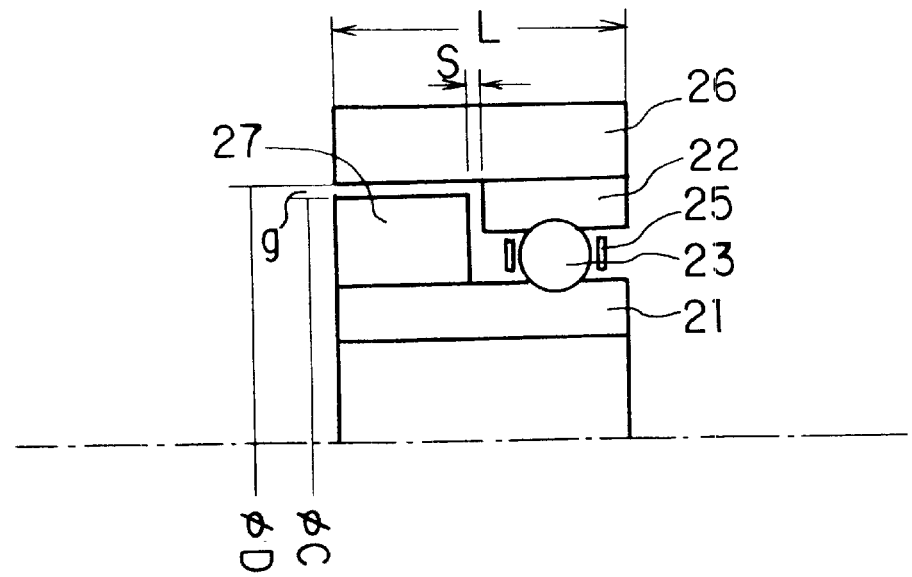
FIG. 5 is a sectional diagram showing the 2nd embodiment of the present invention using a single compound bearing.

In another embodiment, as shown in FIG. 5, a single compound bearing structure comprises an inner race 21, having a width L of the size necessary to control the tilt of the axis within the permitted range, and an outer race 22, having a width which is half the width of the above mentioned width L, which is mounted above the outside half of inner race 21 and separated from inner race 21 by a gap. A ball 23 is fitted into this gap between the races and rests in grooves made in each race. The ball 23 is prevented from escaping from the grooves by retainers 25. Inner race 21 has an external form which is super-finished to high precision in one piece and contains the ball groove described above. The outside of outer race 22 is press fitted into outer race sleeve 26, which is made of metal having a cylindrical form of width L.

Sintered, oil-impregnated bearing 27 is arranged in the space formed by the inner parts of outer race 22, ball 23 and retainer 25. As shown in FIG. 5, this sintered, oil-impregnated bearing 27 has an outer diameter which is smaller than the inner diameter of outer race. sleeve 26, and an inner diameter of the same size as the outer diameter of inner race 21. Because of this, sintered, oil-impregnated bearing 27 is press fitted firmly to the outer side of inner race 21 and forms a small gap g with the inner peripheral face of outer race 22. This tilt control gap g, in order to prevent the tilt of the axis from exceeding the permitted range, is determined by the dimensions C and D shown in FIG. 5, and accordingly extremely high precision processing is required.

Figure 7:
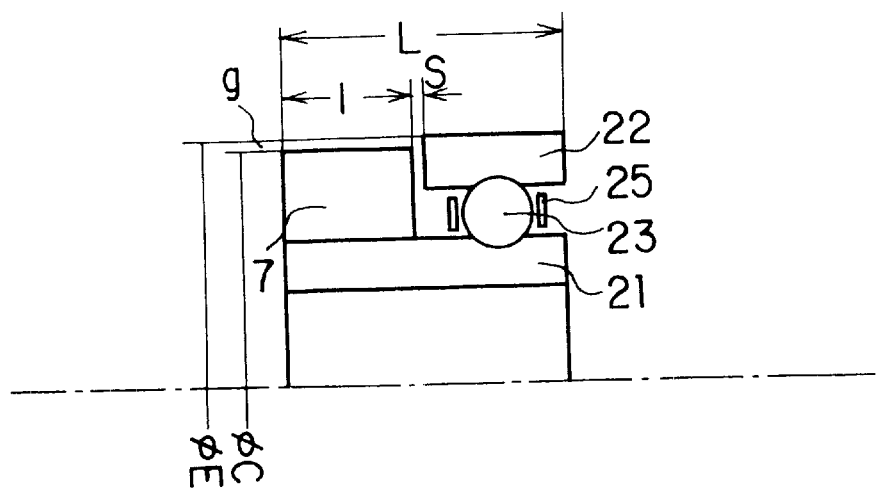
FIG. 7 is a sectional diagram showing the 4th embodiment of the present invention using a single compound bearing.
Figure 9:
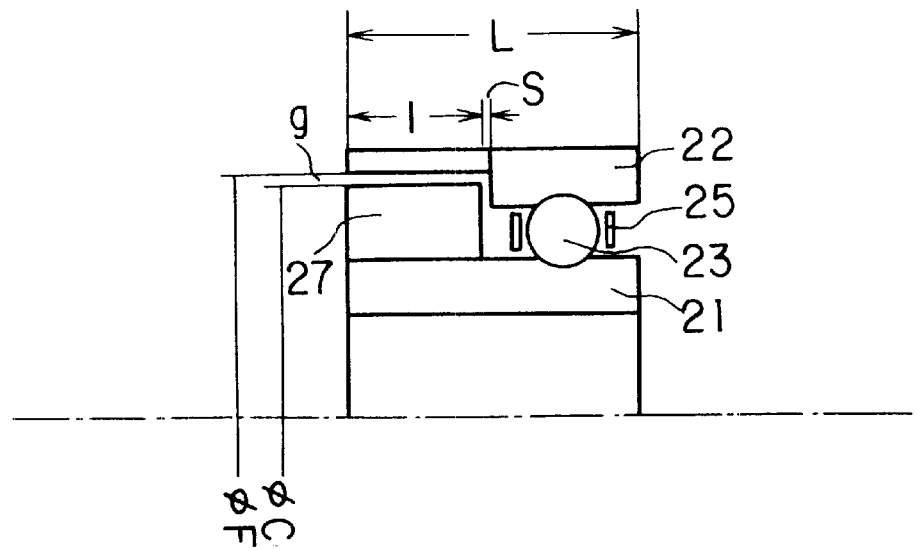
FIG. 9 is a sectional diagram showing the 6th embodiment of the present invention using a single compound bearing.
Figure 11:
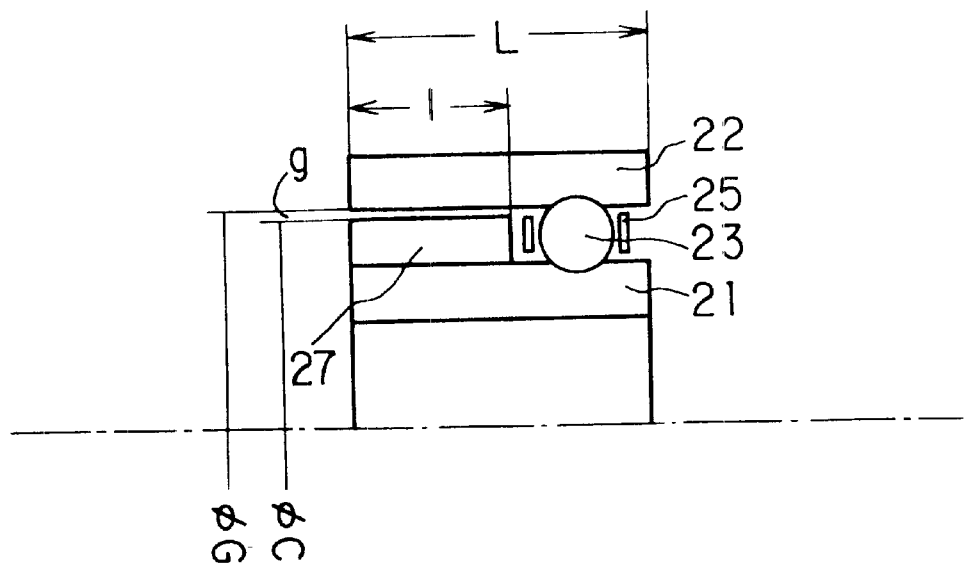
FIG. 11 is a sectional diagram showing the 8th embodiment of the present invention using a single compound bearing.

During operation of the single compound bearing, if either outer race 22 or inner race 21 begins to incline, the edge of surface C of sintered, oil-impregnated bearing 27 will contact surface D of outer race sleeve 26 and prevent any further inclination from occurring. The permissible size of the axial inclination can be determined by the size of tilt control gap g. FIGS. 7, 9 and 11 show basically similar structures to the above, in which a single compound bearing has a tilt control gap g formed on the inner race 21 side. These structures will be described in detail below.

In a single compound bearing shown in FIG. 7, the tilt control gap g is established with outer race 22.

Sintered, oil-impregnated bearing 27, having width I and outer diameter C which forms the specified tilt control gap g, is bonded or press fitted to inner race 21 to make a structure which maintains the gap S with the edge face of outer race 22, Outer race 22 is assembled by bonding or press fitting to inner diameter E of the opposing portion, thus forming tilt control gap g with inner diameter E of the opposing portion.

This compound bearing structure as shown in FIGS. 6 and 7 has the advantage of allowing the diametrical dimension to be reduced In the single compound bearing shown in FIG. 9, the tilt control gap g is established with the side of outer race 22.

In the single compound bearing formed by inner race 21, outer race 22, ball 23 and retainer 25, outer race 22 has a processed stepped section with large diameter F, and sintered, oil-impregnated bearing 27 is press fitted or bonded onto inner race 21 to form a structure which maintains tilt control gap g with this stepped large diameter part F and also establishes gap S with the edge side of the outer race.

In this structure, sintered, oil-impregnated bearing 27 is fixed together with inner race 21 to make a one-piece single compound bearing. This embodiment is easy to use, easy to handle, and does not require an outer race spacer, and is thus advantageous from the cost viewpoint and because it allows size reductions in the diametrical direction. Also, assembly precision is high.

In a single compound bearing shown in FIG. 11, the tilt control gap g is established with the side of outer race 22.

In the single compound bearing formed by inner race 21, outer race 22, ball 23 and retainer 25, sintered, oil-impregnated bearing 27 is press fitted or bonded onto inner race 21 to form a structure which creates tilt control gap g between the inner diameter part G of outer race 22 and outer diameter part C of sintered, oil-impregnated bearing 27.

In this structure, sintered, oil-impregnated bearing 27 is fixed together with inner race 21 to make a one-piece single compound bearing, with the outer diameter of inner race 21 and the inner diameter of outer race 22 both processed to standard bearing dimensions. This structure is easy to use, easy to handle; does not require an outer race spacer or outer race step processing, and is thus most advantageous from the cost viewpoint and because it allows size reductions in the diametrical direction. Also, assembly precision is high.

2. Double compound bearing

Figure 12:
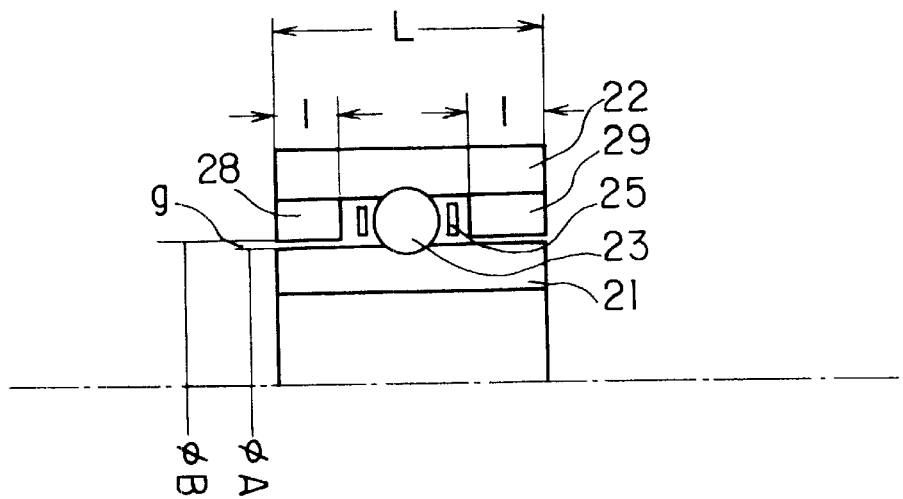
FIG. 12 is a sectional diagram showing the 1st embodiment of the present invention using a double compound bearing.

The double compound bearing shown in FIG. 12 comprises an inner race 21, having a width L of the size necessary to control the inclination of the axis within the permitted range, and an outer race 22, having a width which is the same as the above mentioned width L, which is mounted above the outside of inner race 21 and separated from inner race 21 by a gap. A ball 23 is fitted into the central space between the two races and rests in a groove in the outside of inner race 21 and a groove in the inside of outer race 22. The ball 23 is prevented from escaping from the ball grooves by retainers 25. Inner race 21 is super-finished in one piece to high precision in a shape having the ball groove described above.

Half-sintered oil-impregnated bearings 28 and 29, each having width I, are fitted into the space between inner race 21 and outer race 22 on each side of ball 23. The outer diameters of half-sintered oil-impregnated bearings 28 and 29 are the same as the inner diameter of outer race 22, and their inner diameters are slightly larger than the inner diameter of inner race 21. Because of this, half-sintered, oil-impregnated bearings 28 and 29 are press fitted firmly to the inner side of outer race 22 and form a small gap g with the peripheral face of inner race 21. This tilt control gap g, in order to prevent the inclination from exceeding the permitted range, is determined by the dimensions A and B shown in FIG. 12, and accordingly extremely high precision processing is required.

During operation of the double compound bearing, if either outer race 22 side or inner race 21 side begins to incline, part of one surface B of half-sintered, oil-impregnated bearings 28 or 29 will contact surface A of inner race 21 and prevent any further inclination of the axis from occurring. The size of the inclination of the axis can be determined by the size of tilt control gap g.

Figure 14:
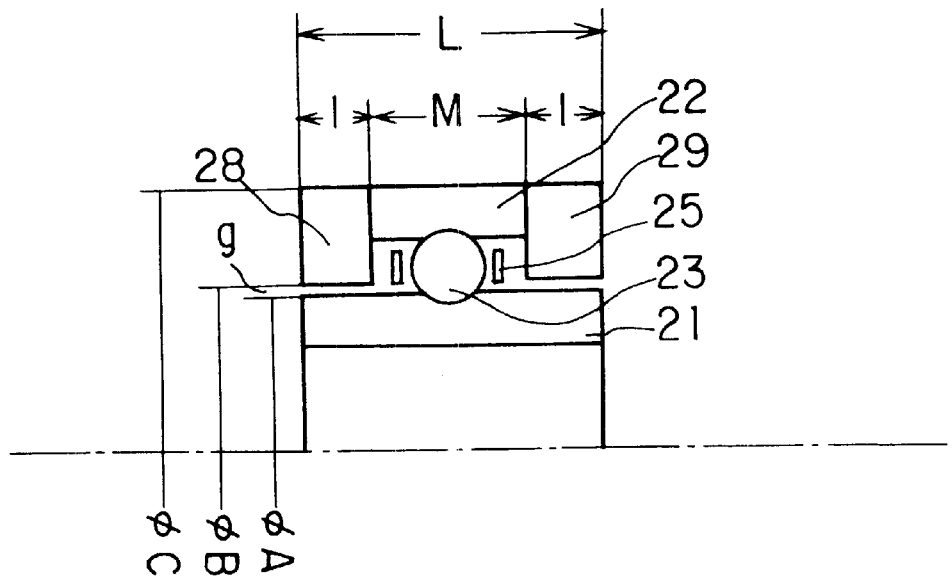
FIG. 14 is a sectional diagram showing the 3rd embodiment of the present invention using a double compound bearing.
Figure 16:
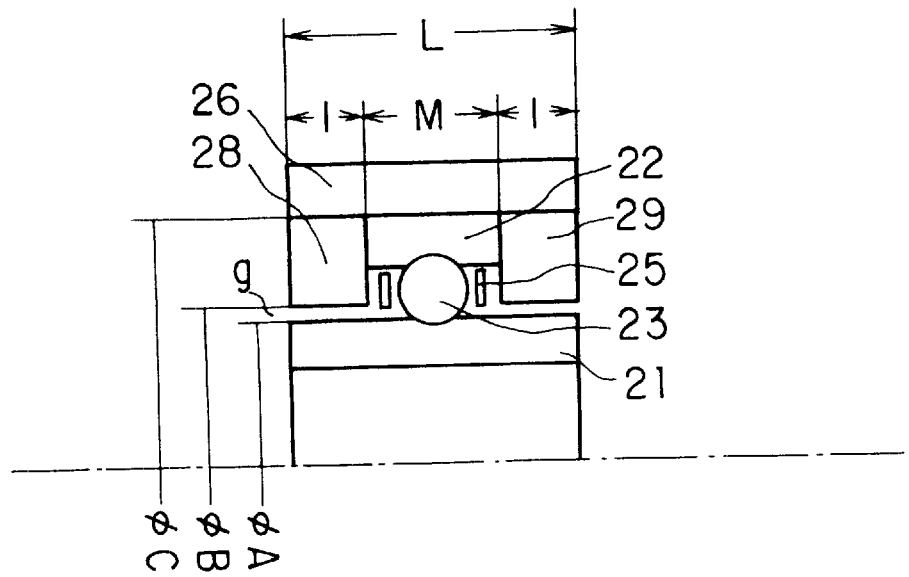
FIG. 16 is a sectional diagram showing the 5th embodiment of the present invention using a double compound bearing.
Figure 18:
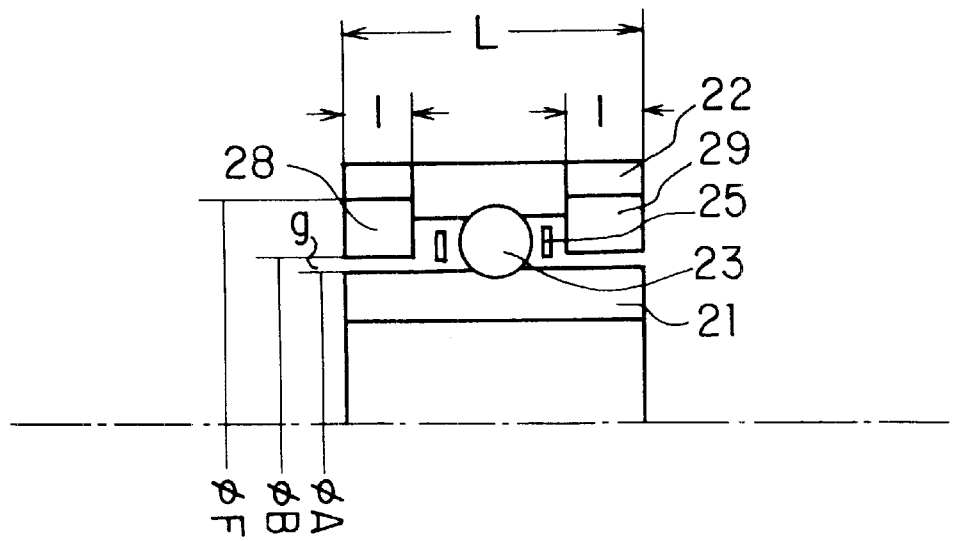
FIG. 18 is a sectional diagram showing the 7th embodiment of the present invention using a double compound bearing.

FIGS. 14, 16 and 18 show basically similar structures to the above, in which a double compound bearing has a tilt control gap g formed on the inner race 21 side. These structures will be described in detail below.

The double compound bearing shown in FIG. 14 has a structure in which the tilt control gap g is established on the inner race 21 side.

Sintered, oil-impregnated bearings 28 and 29, processed to the dimensions outer diameter C, inner diameter B and width L, are press fitted onto either side of outer race 22 of the single row ball bearing formed by inner race 21, outer race 22, ball 23 and retainer 25, thus forming a structure which establishes a tilt control gap g on the inner race 21 side.

In this case, the opposing parts may be freely designed as regards shape, and can be directly assembled together with the opposing parts with no need for an outer sleeve ring 26. This has the advantage of allowing the diametrical dimension to be reduced.

The double compound bearing shown in FIG. 16 has a structure in which the tilt control gap g is established on the inner race 21 side.

Sintered, oil-impregnated bearings 28 and 29, processed to the dimensions outer diameter C, inner diameter B and width L, are press fitted onto the inner diameter part of outer race sleeve 26 (the outer race of the compound bearing) and press onto either side of outer race 22 of the single row ball bearing formed by inner race 21, outer race 22, ball 23 and retainer 25, thus forming a structure which establishes a tilt control gap g with outer race sleeve 26.

In this embodiment, the external diameter of the compound bearing becomes large, but the one-piece structure has the advantages of easy handling and assembly.

The double compound bearing shown in FIG. 18 has a structure in which the tilt control gap g is established on the inner race 21 side.

Sintered, oil-impregnated bearings 28 and 29, processed to the dimensions outer diameter F, inner diameter B and width I, are press fitted onto the inner diameter part of outer race sleeve 26 and press into the large diameter F sections of either side of outer race 22 of the single row ball bearing formed by inner race 21, outer race 22, ball 23 and retainer 25, thus forming a one-piece structure which establishes tilt control gap g with the sides of inner race 21.

In this embodiment, no outer race sleeve is required and the two sintered, oil-impregnated bearings 28 and 29 are directly assembled together with outer race 22 as a one-piece assembly, thus offering the advantages of compactness and smaller radial dimensions.

Figure 13:
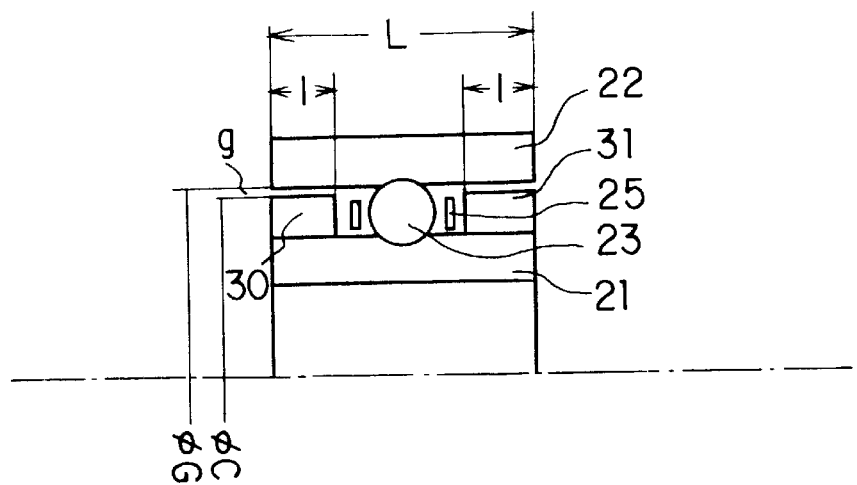
FIG. 13 is a sectional diagram showing the 2nd embodiment of the present invention using a double compound bearing.

In a further embodiment as shown in FIG. 13, a double compound bearing comprises an inner race 21, having a width L of the size necessary to restrain the inclination of the axis within the permitted range, and an outer race 22, having a width which is the same as the above mentioned width L, which is mounted above the outside of inner race 21 and separated from inner race 21 by a gap. A ball 23 is fitted into the central space between the two rings and rests in a groove in the outside of inner race 21 and a groove in the inside of outer race 22. The ball 23 is prevented from escaping from the ball groove by retainers 25. Inner race 21 is super finished in one piece to high precision in a shape having the ball groove described above.

Half-sintered oil-impregnated bearings 30 and 31, each having width L are fitted into the space between inner race 21 and outer race 22 on each side of ball 23. The outer diameters of half-sintered oil-impregnated bearings 30 and 31 are slightly smaller than the inner diameter of outer race 22, and their inner diameters are the same as the outer diameter of inner race 21. Because of this, half-sintered, oil-impregnated bearings 30 and 31 are press fitted firmly to the outer side of inner race 21 and form a small gap g with the inner peripheral face of outer race 22. This tilt control gap g, in order to prevent the inclination from exceeding the permitted range, is determined by the dimensions C and G shown in FIG. 13, and accordingly extremely high precision processing is required.

During operation of the double compound bearing, if either outer race 22 side or inner race 21 side begins to incline, part of one surface C of half-sintered, oil-impregnated bearings 30 and 31 will contact surface G of outer race 22 and prevent any further inclination of the axis from occurring. The size of the inclination of the axis can be determined by the size of tilt control gap g.

Figure 15:
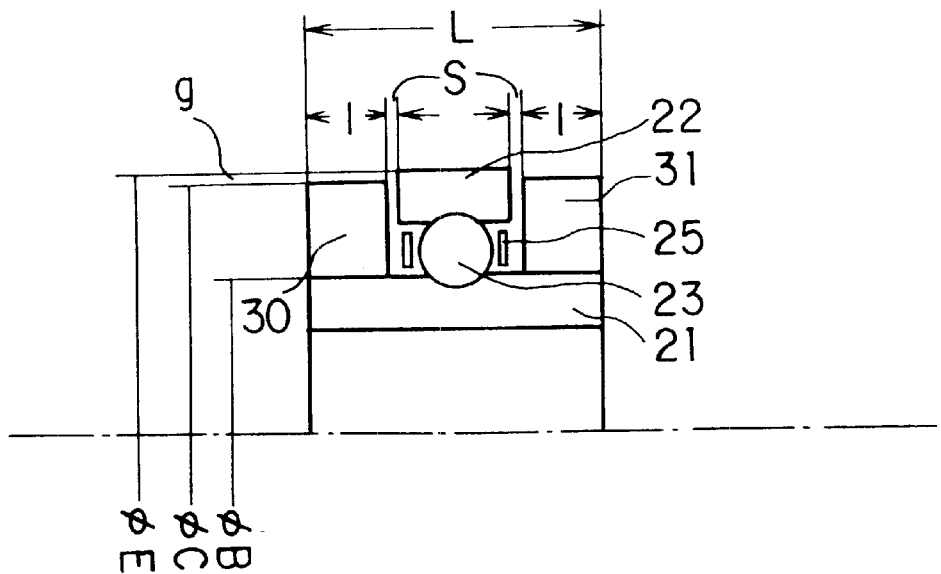
FIG. 15 is a sectional diagram showing the 4th embodiment of the present invention using a double compound bearing.
Figure 17:
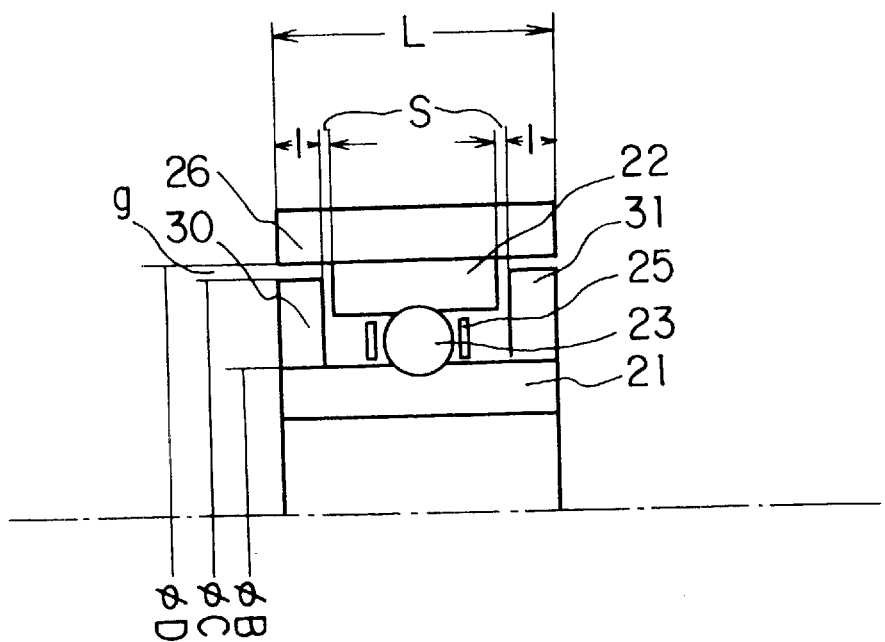
FIG. 17 is a sectional diagram showing the 6th embodiment of the present invention using a double compound bearing.
Figure 19:
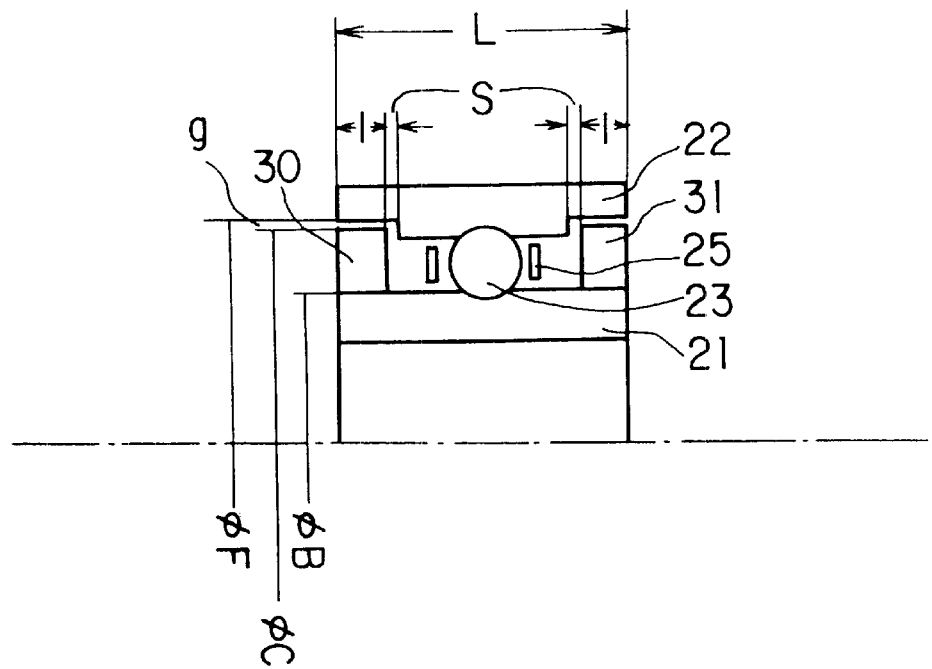
FIG. 19 is a sectional diagram showing the 8th embodiment of the present invention using a double compound bearing.
Figure 20:
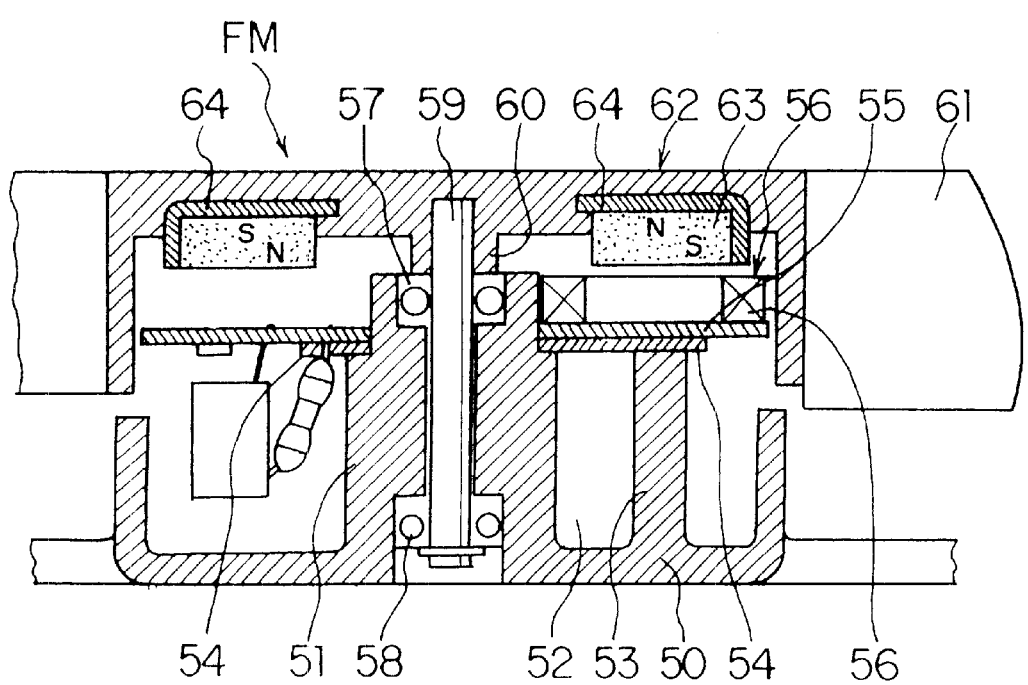
FIG. 20 is a sectional diagram showing an example of the prior art.

FIGS. 15, 17 and 19 show basically similar structures to the above, in which a double compound bearing has a tilt control gap g formed on the inner race 21 side. These structures will be described in detail below.

The double compound bearing shown in FIG. 15 has a structure in which the tilt control gap g is established on the outer race 22 side.

Sintered, oil-impregnated bearings 30 and 31, processed to the dimensions outer diameter C, inner diameter B and width L, are press fitted or bonded onto inner race 21 and mounted so as to preserve a gap S on either side of outer race 22 of the single row ball bearing formed by inner race 21, outer race 22, ball 23 and retainer 25, thus forming a structure which establishes tilt control gap g between the opposing parts.

In this case, the assembly is formed as a single piece unlike the set shown in the example of FIG. 17, and so both handling and assembly are easy. Also, the opposing parts may be freely designed as regards shape, and can be directly assembled together with the opposing parts with no need for an outer sleeve ring. This has the advantage of allowing the radial dimension to be made more compact.

The double compound bearing shown in FIG. 17 has a structure in which the tilt control gap g is established on the outer race side.

Two sintered, oil-impregnated bearings, processed to the dimensions outer diameter C, inner diameter B and width I, are press fitted or bonded onto the outer diameter part of inner race 21 and mounted so as to preserve a gap S on either side of outer race 22 of the single row ball bearing formed by inner race 21, outer race 22, ball 23 and retainer 25, thus forming a structure which establishes tilt control gap g with outer race sleeve 26.

In this embodiment, the outer radial dimension of the double compound bearing becomes large, but its one-piece construction offers the advantages of easy handling and assembly.

The double compound bearing shown in FIG. 19 has a structure in which the tilt control gap g is established on the outer race 22 side.

Sintered, oil-impregnated bearings 30 and 31, processed to the dimensions outer diameter C, inner diameter B and width I, are press fitted or bonded onto the outer diameter part of inner race 21 and mounted, so as to preserve a gap S with the stepped faces of outer race 22, on either side of outer race 22 of the single row ball bearing formed by inner race 21, outer race 22, ball 23 and retainer 25, thus forming a one-piece structure which establishes tilt control gap g with the large diameter faces F formed by a step process on outer race 22.

In this embodiment, no outer race sleeve 26 is required and the two sintered, oil-impregnated bearings 30 and 31 are directly assembled together with outer race 22 as a one-piece assembly, thus offering the advantages of compactness and smaller radial dimensions.

Various types of bearings used in the present invention have been described above, but within the range of the gist of this invention many other formats and applications are possible. For example, the use of inner race 22 as a rotating and stopping axis with no spaces; the use, as a substitute for the sintered, oil-impregnated bearings, of a non-oil-impregnated dry bearing (including materials used as fixed bearings such as ceramics, plastics, and others); or a fluid bearing structure; or a magnetic bearing structure; or the assembly of a seal plate (seal groove) with this compound bearing. These formats and applications are not excluded from the scope of the present invention.

Furthermore, the present invention has been described with regard to embodiments suitable for use in axial fan motors, but this invention can also be said to be suitable for use as the motor bearing structure for use in other office automation related applications such as floppy disk drive motors, hard disk drive motors or DVD drive motors. In addition, the above embodiments show applications of the present invention for use in rotating shaft type flat motors, but it is also applicable to fixed shaft type flat motors. The present invention is also suitable for use in motors of the type described in the prior art example, where the motor uses a coreless coil in the stator and the rotor magnet has a disk shape.

While the present invention has been described in connection with the above-mentioned embodiments, it will be understood that various changes and applications can be made therein within the true spirit of the present invention, and these changes and applications are not excluded from the scope of the present invention.

As explained in detail above, the present invention provides stable rotation with support for the load in both the radial and thrust directions, using only a single compound bearing. Furthermore, this compound bearing allows the dimensions in the radial direction to be reduced in comparison to those in which a normal structure consisting of two rows of ball bearings is used, thus allowing the provision of a flatter radial flow fan motor.

Also, in the case of a radial flow fan motor, the radial and thrust load is small and so the life of the bearing is equivalent to that of a ball bearing. The cost is also lower than that of a double row ball bearing.

As explained in detail above, the present invention provides a structure using one single row ball bearing with 1 ball (the smallest unit which can be used in a ball bearing), which, in order to solve the problem of inclination and vibration in the inner and outer races, uses a sintered, oil-impregnated bearing with the objective of preventing inclination, where an inner or an outer race of a single row ball bearing is mounted either on one side or on both sides, in a structure which prevents inclined rotation, and thus provides stable rotational support to the same extent as conventional ball bearings which require a minimum of 2 balls, and in which the bearing can be made thinner in the direction of rotational support.

What is claimed is:

1. A bearing structure for a flat motor, having a rotor provided with a permanent magnet which is rotatably supported by the bearing structure mounted on a casing and a stator structure mounted on the casing, in which a rotating magnetic field generated by the stator structure in opposition to the permanent magnet causes the rotor to rotate, wherein either a first outer race or a first inner race of the bearing structure comprising a single row ball bearing and a cylindrical bearing, one of the first inner or outer races being fixed to the bearing structure mounted on the casing, while the other one of the first inner or outer races is fixed to the rotor, the bearing structure for the flat motor comprising:

a cylindrical sintered oil-impregnated bearing comprising the cylindrical bearing;

a common inner race for the single row ball bearing and the cylindrical sintered oil-impregnated bearing;

a second outer race for the single row ball bearing; and a ball for the single row ball bearing, which fits into ball grooves cut in opposing surfaces of the common inner race and the second outer race to hold the ball, wherein the sintered oil-impregnated bearing is formed in a cylindrical shape and positioned on a side of the ball, a first face of the sintered oil-impregnated bearing being attached to either an inner or an outer face of the bearing structure, and a second face of the sintered oil-impregnated bearing opposing the other of the inner or outer face of the bearing structure to form a gap therebetween.

2. A bearing structure for a flat motor according to claim 1, wherein said flat motor is an axial fan motor.

3. A bearing structure for a flat motor according to claim 1, wherein said flat motor is a flat motor to drive the rotation of a recording media comprising a disk.

4. A bearing structure for a flat motor, having a rotor provided with a permanent magnet which is rotatably supported by the bearing structure mounted on a casing and a stator structure mounted on the casing, in which a rotating magnetic field generated by the stator structure in opposition to the permanent magnet causes the rotor to rotate, wherein either a first outer race or a first inner race of the bearing structure comprising a single row ball bearing and a cylindrical bearing, one of the first inner or outer races being fixed to the bearing structure mounted on the casing, while the other one of the first inner or outer faces is fixed to the rotor, the bearing structure for the flat motor comprising:

a cylindrical sintered oil-impregnated bearing comprising the cylindrical bearing;

a common inner race for the single row ball bearing and the cylindrical sintered oil-impregnated bearing;

a second outer race for the single row ball bearing; and a ball for the single row ball bearing, which fits into ball grooves cut in opposing surfaces of the common inner race and the second outer race to hold the ball, wherein the sintered oil-impregnated bearing is formed in a cylindrical shape and positioned on a side of the ball, an outer face of the sintered oil-impregnated bearing being attached to a portion of the bearing structure, and an inner face of the sintered oil-impregnated bearing and a face of the first inner race form a gap therebetween.

5. A bearing structure for a flat motor according to claim 4, wherein the portion of the bearing structure to which the outer face of the sintered oil-impregnated bearing is fixed has an outer race sleeve fitted to the first outer race.

6. A bearing structure for a flat motor according to claim 4, wherein the portion of the bearing structure to which the outer face of the sintered oil-impregnated bearing is fixed has an extension portion.

7. The bearing structure according to claim 4, wherein:
   the sintered oil-impregnated bearing is formed in a cylindrical shape and positioned on a side of the ball, a first face of the sintered oil-impregnated bearing is attached to either an inner or an outer face of the bearing structure, and a second face of the sintered oil-impregnated bearing opposes the other of the inner or outer face of the bearing structure to form a gap therebetween.

8. A bearing structure for a flat motor, having a rotor provided with a permanent magnet which is rotatably supported by the bearing structure mounted on a casing and a structure mounted on the casing, in which a rotating magnetic field generated by the stator structure in opposition to the permanent magnet causes the rotor to rotate, wherein either a first outer race or a first inner race of the bearing structure comprising a single row ball bearing and a cylindrical bearing, one of the first inner or outer races being fixed to the bearing structure mounted on the casing, while the other one of the first inner or outer races is fixed to the rotor, the bearing structure for the flat motor comprising:

a cylindrical sintered oil-impregnated bearing comprising the cylindrical bearing;

a common inner race for the single row ball bearing and the cylindrical sintered oil-impregnated bearing;

a second outer race for the single row ball bearing; and a ball for the single row ball bearing, which fits into ball grooves cut in opposing surfaces of the common inner race and the second outer race to hold the ball, wherein the sintered oil-impregnated bearing is formed in a cylindrical shape and positioned on a side of the ball, and an inner face of the sintered oil-impregnated bearing being attached to the first inner race and an outer face of the sintered oil-impregnated bearing and a face of the bearing structure opposing each other to form a gap therebetween.

9. A bearing structure for a flat motor according to claim 8, wherein the face of the bearing structure which opposes the outer face of the sintered oil-impregnated bearing comprises an outer race sleeve fitted onto its outer race.

10. A bearing structure for a flat motor according to claim 8, wherein the face of the bearing structure which opposes the outer face of the sintered oil-impregnated bearing comprises an extension portion.

11. A bearing structure for a flat motor, having a rotor provided with a permanent magnet which is rotatably supported by the bearing structure mounted on a casing and a stator structure mounted on the casing, in which a rotating magnetic field generated by the stator structure in opposition to the permanent magnet causes the rotor to rotate, wherein either a first outer race or a first inner race of the bearing structure comprising a single row ball bearing and a cylindrical bearing, one of the first inner or outer races being fixed to the bearing structure mounted on the casing, while the other one of the first inner or outer races is fixed to the rotor, the bearing structure for the flat motor comprising:

a plurality of cylindrical sintered oil-impregnated bearings comprising the cylindrical bearing;

a common inner race for the single row ball bearing and the cylindrical sintered oil-impregnated bearing;

a second outer race for the single row ball bearing; and a ball for the single row ball bearing, which fits into ball grooves cut in a center part of opposing surfaces of the common inner race and the second outer race to hold the ball, wherein the sintered oil-impregnated bearings are formed in a cylindrical shape and positioned on first and second sides of the ball, and outer faces of the sintered oil-impregnated friction bearings being attached to the bearing structure, inner faces of the sintered oil-impregnated bearings and the face of inner race forming gaps therebetween.

12. A bearing structure for a flat motor according to claim 11, wherein the bearing section to which the outer face of the sintered oil-impregnated bearing is fixed has an outer race sleeve fitted onto its outer race.

13. A bearing structure for a flat motor according to claim 11, wherein the bearing section to which the outer face of the sintered oil-impregnated bearing is fixed has an extension portion.

14. A bearing structure for a flat motor, having a rotor provided with a permanent magnet which is rotatably supported by the bearing structure mounted on a casing and a stator structure mounted on the casing, in which a rotating magnetic field generated by the stator structure in opposition to the permanent magnet causes the rotor to rotate, wherein either a first outer race or a first inner race of the bearing structure comprising a single row ball bearing and a cylindrical bearing, one of the first inner or outer races being fixed to the bearing structure mounted on the casing, while the other one of the first inner or outer races is fixed to the rotor, the bearing structure for the flat motor comprising:

a plurality of cylindrical sintered oil-impregnated bearings comprising the cylindrical bearing;

a common inner race for the single row ball bearing and the cylindrical sintered oil-impregnated bearings;

a second outer race for the single row ball bearing; and a ball for the single row ball bearing, which fits into ball grooves cut in a center part of opposing surfaces of the common inner race and the second outer race to hold the ball; and wherein the sintered oil-impregnated bearings are formed in a cylindrical shape and positioned on first and second sides of the ball, inner faces of the sintered oil-impregnated bearings being attached to the bearing structure, and outer faces of the sintered oil-impregnated bearings and a face of the first outer race form gaps therebetween.

15. A bearing structure for a flat motor according to claim 14, wherein the face of the bearing portion which opposes the outer faces of the sintered oil-impregnated bearings comprises an outer race sleeve fitted onto the first outer race.

16. A bearing structure for a flat motor according to claim 14, wherein the face of the bearing portion which opposes the outer faces of the oil-impregnated bearing bearings comprises an extension portion.

17. A bearing structure for a flat motor, the motor having a casing and a rotor rotatably mounted on the casing, the bearing structure for the flat motor comprising:

a first outer race;

a first inner race, either the first outer race or the first inner race comprising a single row ball bearing and a cylindrical bearing comprising a cylindrical sintered oil-impregnated bearing, one of the first inner or outer races being fixed to the casing and the other one of the first inner or outer races being fixed to the rotor;

a common inner race for the single row ball bearing and the cylindrical sintered oil-impregnated bearing;

a second outer race for the single row ball bearing; and a ball for the single row ball bearing.

* * * * *

UNITED STATES PATENT AND TRADEMARK OFFICE
CERTIFICATE OF CORRECTION

PATENT NO. : 6,420,809 B1
DATED : July 16, 2002
INVENTOR(S) : Rikuro Obara

It is certified that error appears in the above-identified patent and that said Letters Patent is hereby corrected as shown below:

<u>Title page,</u>
Item [75], Inventor, delete "-ken"
Item [56], References Cited, OTHER PUBLICATIONS, change "f" to -- of --.

<u>Column 4,</u>
Line 55, change "capshaped" to -- cap-shaped --.

<u>Column 7,</u>
Line 39, delete "." after "race".

Signed and Sealed this

Twenty-sixth Day of November, 2002

Attest:

Attesting Officer

JAMES E. ROGAN
Director of the United States Patent and Trademark Office